Patented Nov. 3, 1942

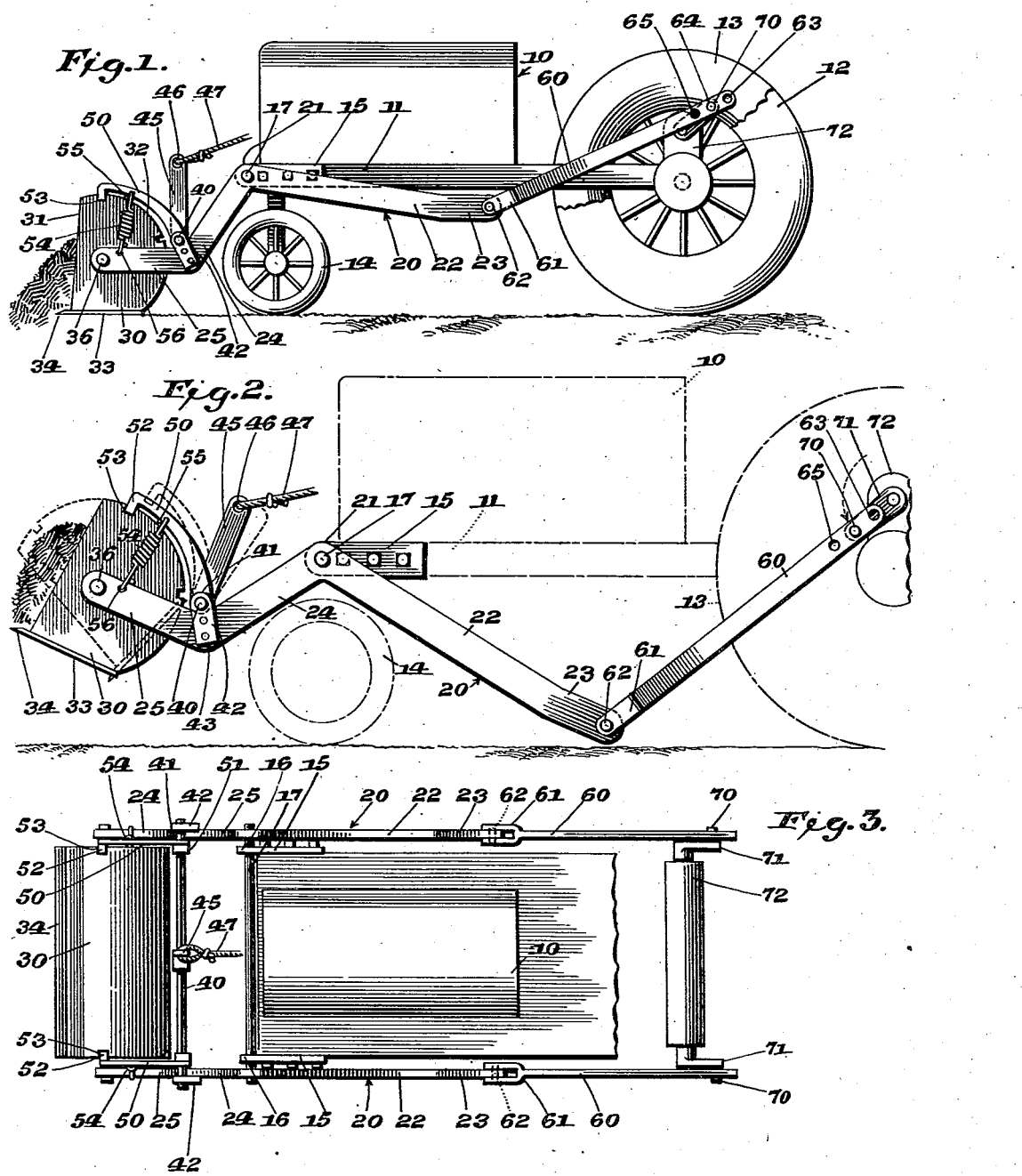

2,300,843

UNITED STATES PATENT OFFICE 2,300,843

DIRT REMOVER

Ran H. Norwood and Finus McCarn,
Marlow, Okla.

Application December 5, 1941, Serial No. 421,834

4 Claims. (Cl. 37—126)

This invention relates to a dirt remover.

An object of the invention is the provision of a device which may be removably attached to a tractor carrying a shovel for removing dirt from the ground surface and then for raising the shovel which removes the dirt until the shovel is ready to be released for dumping purposes.

Another object of the invention is the provision of an attachment for a tractor which may be readily attached or removed as desired and which is of simple construction for carrying a shovel at the forward end of the tractor for scooping up dirt and for dumping the dirt, as desired, the device including angularly disposed levers pivoted on the tractor with means connected to the power plant of the tractor for operating the levers to raise the shovel or for maintaining the shovel in operative relation with the ground.

A still further object of the invention is the provision of an attachment for a tractor which is operated from the power plant of said tractor and which is adapted to support a shovel at the front of the tractor whereby the shovel can be made to scoop up dirt at varying depths and for raising the shovel after it has been filled to a predetermined height whence the shovel may be released by a latch bar for dumping the dirt.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a side view in elevation of a tractor showing our invention applied thereto.

Figure 2 is a side view in elevation of a tractor attachment for supporting and positioning a shovel.

Figure 3 is a plan view of the same.

Referring more particularly to the drawing, 10 generally designates a tractor having longitudinal bars 11 forming part of the frame of the tractor. The frame is supported by means of rear wheels 12 and 13 and front wheels 14.

A pair of brackets 15 are secured to the side bars 11 of the tractor and extend forwardly of the tractor as shown at 16 to provide bearings for a rod 17.

A lever 20 is located at each side of the tractor and in parallel relation with the frame bars 11.

An intermediate portion 21 which forms a fulcrum for each lever is pivotally mounted on the end of the rod 17. Each lever consists of a rearwardly extending arm 22 having a short bent portion 23, a downwardly turned portion or arm 24 and a forwardly extended portion 25. The portions 22 and 24 of said lever form a bell crank which is rocked on its pivot 17.

A shovel generally designated by the numeral 30 has an outer open end 31, a rear curved wall 32 and a flat bottom 33. The flat bottom as shown at 34 projects forwardly and is sharpened to form a cutting edge so that when the shovel is forced forwardly at a predetermined depth in the soil the edge 34 will cut through the soil and the dirt will be forced inwardly of the shovel.

This shovel as shown at 36 has trunnions which are received by bearings on the free ends of the forwardly extending arms 25 of the levers 20.

A rock shaft 40 has its ends mounted in bearings 41 formed at the upper ends of brackets 42 which are secured at the bent portion 43 of the angularly disposed arms 24 and 25 at the forward end of the lever 20.

A lever 45 has its lower end secured to the rock shaft 40 and at a point on the rock shaft which is substantially midway of the ends of said shaft. The upper free end of the lever 45 has a perforation 46 which is adapted to receive one end of a cable or rope 47 which extends to the driver's seat of the tractor so that when a pull is exerted on the cable or rope 47 the lever 45 will be rocked as will be the shaft 40.

A curved latch bar 50 is secured to the outer ends of the rock shaft 40, as shown in Fig. 3. Each latch bar is provided with a sleeve 51 at the inner end which may be welded or the sleeve may be secured to the bar 40 by means of set screws mounted in threaded passages in said sleeves and engaging securely the shaft 40. The outer end of each latch bar 50 is provided with a lug 52 which is adapted to seat in a notch 53 formed in an end of the shovel 30. It will be noted in Fig. 3 that these lugs extend laterally inwardly from the bars 50 with the latch bars being located adjacent the outer ends of the shovel 30.

A spring 54 has one end secured at 55 to the latch bar 50 while the other end 56 is secured to the forwardly extending arm 25 of the lever 20. It will be noted that all of the parts just described are found on opposite sides of the tractor; in other words, the part found on one side of the tractor is duplicated on the other side for simultaneous operation except the lever 45 and the cable 47.

A link 60 is provided with a fork 61 at its inner end which embraces the angular portion 23 of the arm 22 of the lever 20. This fork is perforated as is the free end of the arm to receive a bolt or pin 62 for pivotally connecting the link at its inner end to the inner end of the lever 20. The link 60 shown in Fig. 1 at one side of the tractor is duplicated on the opposite side of the tractor as shown in Fig. 3. The outer end of each link is provided with a plurality of perforations 63, 64 and 65 to receive a crank pin 70 on the end of an arm 71 which is rocked by a rockable member 72 which is operated by the power plant of the tractor. The method of operating the member 72 from the power plant is not shown because such mechanism is old in the art and forms part of the equipment of the tractor. It will be noted from Fig. 3 that the crank 71 is duplicated upon the opposite side of the machine for oscillating the associated link 60.

It will be noted that when the cranks 71 are rocked the link 60 will be shifted or reciprocated so that the inner arm 22 of the lever 20 will be moved downwardly to the position shown in Fig. 2 for raising the shovel 30 to the full line position shown in Fig. 2.

The adjustment of the pin 70 within the openings 63 to 65 inclusive will determine the depth of cut of the shovel 30. In other words, the pin 70 as shown in Fig. 1 is located within the opening 64 at the end of each link 60. When the pin 70 is moved to the extreme opening 63 the depth of the cut of the shovel 30 will not be as great as when the pins 70 are received by the openings 64 and 65.

When the tractor is moving along a definite path with the rolling fresno 30 in the position shown in Fig. 1 with the power applied to the member 72, said member will be revolved as will be the arms or cranks 71 whereby the lever 20 will be rocked. When the crank arms are in the position shown in Fig. 1, the shovel will be in operative relation with the ground whereby the shovel will be filled with soil. However, as the crank arms move in the direction indicated by the arrows in Figs. 1 and 2, the inner end of the lever 20 will be lowered by the reciprocation of the links 60. Therefore, the outer ends of the levers 20 will be elevated and the shovel 30 will be elevated to the position shown in Fig. 2 in full lines. In order to release the load when the shovel is elevated it is only necessary to pull on the cable 47 whereby the shaft 40 will be rocked as will be the latch bars 50 so that the lugs 52 will be moved out of the notches 53 formed in the opposite ends of the shovel 30. Due to the force of gravity and due to the fact that the dirt in the shovel overbalances the same said shovel will be tilted forwardly as indicated in dotted lines and thereby release the dirt which has been collected therein.

It will also be noted that when the crank arms 71 are moving from their lowered position and upwardly towards the right in the direction indicated by the arrow in Fig. 1, the front end of the shovel will be forced into the soil and the depth to which the cutting edge of the shovel penetrates the soil will depend upon the position of the pin 70 in the perforations 63, 64 and 65.

This construction provides for a device which may be readily attached to a tractor for removing soil from a tract or the device may be readily detached so that the tractor can be used for other purposes. Thus the ready detachability of the device is aided by the fact that the various parts such as 22, 23, 24, 25 of the levers 20 are formed integrally so that when the bearings of the levers at their fulcrums 21 are removed from the ends of the bar or rod 17 the shovel and the parts associated therewith are also removed. It is then only necessary to slip the outer ends of the links 60 from the crank pins 70. Nuts may be employed in aiding for maintaining the levers on the ends of the rod 17 and the outer ends of the link 60 on the pins 70 or cotter pins may be employed for the purpose.

We claim:

1. In a tractor, a shovel disposed forwardly of the tractor, means for supporting and operating said shovel comprising a pair of levers, means on the forward end of the tractor for pivotally mounting intermediate portions of the levers on the tractor so that one portion of each lever extends forwardly of the tractor while the other portion extends toward the rear thereof, the forward portion of each lever extending downwardly from the rear portion then outwardly, means pivotally connecting the opposite ends of the shovel to the free ends of the forward portions of said levers, means on the levers for releasably holding the shovel in an operative digging position, a link each having pivotal connections at one end with the free ends of the rear portions of the levers, a power take-off on the rear end of the tractor and means operatively connecting the power take-off with the other ends of said links for causing rocking of the levers to move the shovel to an elevated and inoperative position.

2. In a tractor having a power plant, a shovel disposed forwardly of said tractor, means for raising and supporting the shovel at the forward end of the tractor comprising a lever pivotally mounted intermediate the ends thereof on and at each side of the tractor, said levers each having a down-turned portion and then an out-turned portion forwardly of their pivots, means swingably mounting the opposite ends of the shovel on the free ends of the outturned portions of the levers, the remaining portions of said levers being located in parallel relation with the sides of the tractor, a link each having pivotal connections with the free end of the remaining portions of the levers, means connected with the power plant of the tractor for causing reciprocation of the links and rocking of the levers and means on the levers for releasably holding the shovel in an operative position.

3. An attachment for a tractor having a power take-off comprising a pair of parallel levers, means for removably and pivotally mounting intermediate portions of said levers on the front of the tractor so that portions of the levers will extend forwardly of the tractor, a shovel swingably mounted on the free forward ends of the levers, means on the levers for releasably retaining the shovel in an operative position, said levers being bent downwardly upon opposite sides of the pivots, a link extending upwardly from the rear end of each lever and pivotally connected thereto, and means connecting the free ends of the links with the power take-off for causing reciprocation of the links and rocking of the levers.

4. An attachment for a tractor having a power take-off comprising a pair of parallel levers, means for removably and pivotally mounting intermediate portions of said levers on the front of the tractor so that portions of the levers will extend forwardly of the tractor, a shovel swingably mounted on the free forward ends of the levers, means on the levers for releasably retaining the shovel in an operative position, said levers being bent downwardly upon opposite sides of the pivots, a link extending upwardly from the rear end of each lever and pivotally connected thereto, the upper free ends of the links having a plurality of spaced perforations, cranks having pins adapted to be operated by the power take-off, said pins adapted to be received by one of the perforations in the links, the perforations selected determining the depth to which the cutting edge penetrates the soil.

RAN H. NORWOOD.
FINUS McCARN.